US009690924B2

(12) United States Patent
McClure et al.

(10) Patent No.: US 9,690,924 B2
(45) Date of Patent: Jun. 27, 2017

(54) TRANSPARENT TWO-FACTOR AUTHENTICATION VIA MOBILE COMMUNICATION DEVICE

(71) Applicant: Microsoft Corporation, Redmond, WA (US)

(72) Inventors: Marc McClure, Seattle, WA (US); Ran Michaely, Redmond, WA (US); Geir Olsen, Kirkland, WA (US); Benjamin Vincent, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 14/279,010

(22) Filed: May 15, 2014

(65) Prior Publication Data
US 2015/0334564 A1    Nov. 19, 2015

(51) Int. Cl.
| G06F 17/30 | (2006.01) |
| G06F 21/43 | (2013.01) |
| G06F 21/31 | (2013.01) |
| G06F 21/40 | (2013.01) |
| H04W 12/06 | (2009.01) |
| H04W 4/14 | (2009.01) |
| H04L 29/06 | (2006.01) |

(52) U.S. Cl.
CPC ............. *G06F 21/43* (2013.01); *G06F 21/31* (2013.01); *G06F 21/40* (2013.01); *H04L 63/18* (2013.01); *H04W 4/14* (2013.01); *H04W 12/06* (2013.01)

(58) Field of Classification Search
CPC ....... H04W 12/06; H04W 12/12; H04W 4/14; G06F 21/31; G06F 21/40; G06F 21/34; G06F 2221/2129; G06F 2221/2133; G06Q 20/425; G06Q 20/32; G06Q 20/3255; G06Q 20/385; G06Q 20/40; G06Q 20/322; G06Q 20/3674; G06Q 20/4016; G06Q 20/4097; G06Q 20/3226; H04L 9/3234; H04L 2209/56; H04L 9/0866
USPC ................... 726/2, 5, 9, 7, 10; 455/410, 411
See application file for complete search history.

(56) References Cited

U.S. PATENT DOCUMENTS

| 6,836,651 | B2 * | 12/2004 | Segal et al. ................... 455/405 |
| 8,156,335 | B2 | 4/2012 | Lin et al. |
| 8,572,701 | B2 * | 10/2013 | Rathbun ........................... 726/6 |
| 8,578,454 | B2 | 11/2013 | Grim |
| 8,752,125 | B2 * | 6/2014 | Baharis et al. ................... 726/2 |

(Continued)

OTHER PUBLICATIONS

Hallsteinsen et al., "Using the Mobile Phone as a Security Token for Unified Authentication," Published Aug. 25, 2007, http://ieeexplore.ieee.org/stamp/stamp.jsp?tp=& arnumber=4300040, 6 pages.

(Continued)

*Primary Examiner* — Mohammed Waliullah
(74) *Attorney, Agent, or Firm* — Klarquist Sparkman, LLP

(57) ABSTRACT

Two-factor authentication can be provided transparently to a user by virtue of proof information available at a mobile communication device. For example, after an access request for a service is sent, an authentication code can be intercepted from a responsive incoming message. The technologies can incorporate a cost proof as part of a cost optimization. Other features such as obfuscation and separate channels can be incorporated into the technologies to provide a superior user experience while implementing superior security.

17 Claims, 10 Drawing Sheets

(56) References Cited

U.S. PATENT DOCUMENTS

| | | | |
|---|---|---|---|
| 8,826,397 B2* | 9/2014 | Sheets et al. ............... | 726/6 |
| 8,868,919 B2* | 10/2014 | Barton et al. ............... | 713/182 |
| 2005/0021975 A1 | 1/2005 | Liu | |
| 2005/0268107 A1 | 12/2005 | Harris | |
| 2007/0027775 A1* | 2/2007 | Hwang ............... | 705/26 |
| 2008/0077534 A1* | 3/2008 | Son ............... | G06Q 20/02 705/76 |
| 2009/0119754 A1* | 5/2009 | Schubert ............... | 726/4 |
| 2011/0060684 A1* | 3/2011 | Jucht et al. ............... | 705/42 |
| 2011/0119156 A1* | 5/2011 | Hwang ............... | G06Q 20/12 705/26.41 |
| 2012/0031969 A1* | 2/2012 | Hammad ............... | 235/380 |
| 2012/0136796 A1* | 5/2012 | Hammad ............... | G06Q 20/12 705/67 |
| 2012/0295580 A1* | 11/2012 | Corner ............... | 455/405 |
| 2013/0018793 A1* | 1/2013 | Wong et al. ............... | 705/44 |
| 2013/0042314 A1* | 2/2013 | Kelley ............... | H04L 9/3215 726/9 |
| 2013/0160098 A1* | 6/2013 | Carlson et al. ............... | 726/6 |
| 2013/0312078 A1 | 11/2013 | Oberheide et al. | |
| 2014/0046850 A1* | 2/2014 | Xiang et al. ............... | 705/44 |
| 2014/0156531 A1* | 6/2014 | Poon et al. ............... | 705/44 |
| 2014/0245396 A1 | 8/2014 | Oberheide et al. | |
| 2015/0073996 A1* | 3/2015 | Makhotin et al. ............... | 705/71 |

OTHER PUBLICATIONS

Aloul et al., "Two Factor Authentication Using Mobile Phones," In IEEE International Conference on Computer Systems and Applications, Published May 2009, www.aloul.net/papers/faloul_aiccsa09.pdf, 4 pages.

Di Pietro et al., "A Two-Factor Mobile Authentication Scheme for Secure Financial Transactions," In Proceedings of International Conference on Mobile Business, http://ieeexplore.ieee.org/stamp/stamp.jsp?tp=&arnumber=1493584, published Jul. 11, 2005, 7 pages.

Shu et al., "Mobile Authentication Scheme Using SMS," In Proceedings of International Conference on Services Science, Management and Engineering, http://esfih.com/pdf/2009/Mobile-Authentication-Scheme-Using%20SMS.pdf, published Jul. 11, 2009, 4 pages.

"Using Certificates for Mobile Device Authentication," Microsoft Technet, Feb. 14, 2008, 4 pages.

"Two-Step Verification," *Wikipedia*, visited Apr. 16, 2014, 3 pages.

* cited by examiner

TRANSPARENT TWO-FACTOR AUTHENTICATION VIA MOBILE COMMUNICATION DEVICE

BACKGROUND

In the fields of computer and network security, two-factor authentication is known to be a significant improvement over single-factor authentication. However, successfully implementing two-factor authentication in a consumer context has remained elusive due to the logistics of execution. For example, techniques that rely on generation of tokens can be very secure but often cause headaches for users.

Because users can face hurdles when attempting to take advantage of two-factor authentication, there remains room for improvement.

SUMMARY

The Summary is provided to introduce a selection of concepts in a simplified form that are further described below in the Detailed Description. The Summary is not intended to identify key features or essential features of the claimed subject matter, nor is it intended to be used to limit the scope of the claimed subject matter.

An embodiment can be implemented as a method that comprises from a mobile communication device, receiving a service access request via a first channel, wherein the service access request comprises a delivery destination proof and a cost proof; authenticating the delivery destination proof; authenticating the cost proof; responsive to authenticating the delivery destination proof and the cost proof, sending an authentication code message via a channel different from the first channel; receiving a response to the authentication code message; and responsive to receiving the response to the authentication code message, sending an authorization token message to the mobile communication device.

An embodiment can be implemented as a mobile communication device that comprises one or more processors coupled to memory; a stored cost proof; a stored delivery destination proof; a service access request orchestrator configured to send a request for access to a service, wherein the request comprises the stored cost proof and the stored delivery destination proof; an intercept component configured to intercept an incoming authentication code message received responsive to request for access to the service and configured to automatically respond thereto with a message comprising an authentication code and further configured to receive an authorization token sent in response to the message comprising the authentication code; and an authorization token sending component configured to send the authorization token in conjunction with a request for a service protected by two-factor authentication.

An embodiment can be implemented as one or more computer-readable media that comprises a cost proof establishing that the mobile communication device is associated with a paying account; a delivery destination proof derived from a delivery destination monitored by the mobile communication device, wherein the delivery destination comprises a telephone number of the mobile communication device; computer-executable instructions causing the mobile communication device to perform a method comprising via a first channel, sending a service access request for a protected service, wherein the request comprises a username, password, the cost proof, and the delivery destination proof; intercepting a message received via a second channel responsive to sending the service access request for the protected service via the first channel, wherein intercepting comprises watching for a response to the service request receivable via the delivery destination; from the message received via the second channel, deriving an authentication code; sending an automatic response to the message received via the second channel, wherein the automatic response comprises the authentication code and the cost proof; and receiving an authorization token in response to the automatic response; whereby transparent two-factor authentication is performed transparently for the mobile communication device.

As described herein, a variety of other features and advantages can be incorporated into the technologies as desired.

DETAILED DESCRIPTION

Example 1—Example Overview

The technologies described herein can be used for a variety of transparent two-factor authentication scenarios, and adoption of the technologies can provide improved techniques for authenticating users of protected services. The technologies can support user interfaces that implement transparent two-factor authentication via a mobile communication device. Other features described herein can be implemented to provide superior security and cost optimization. By adding a second factor (e.g., "something you have") to the authentication process while maintaining transparency, an overall superior user experience with more reliable authentication and improved overall security can result without annoyance to the user.

The technologies can support a variety of authentication scenarios as described herein.

Various other features can be implemented and combined as described herein.

Example 2—Example System Implementing Seamless Call Transitions

Figure 1:
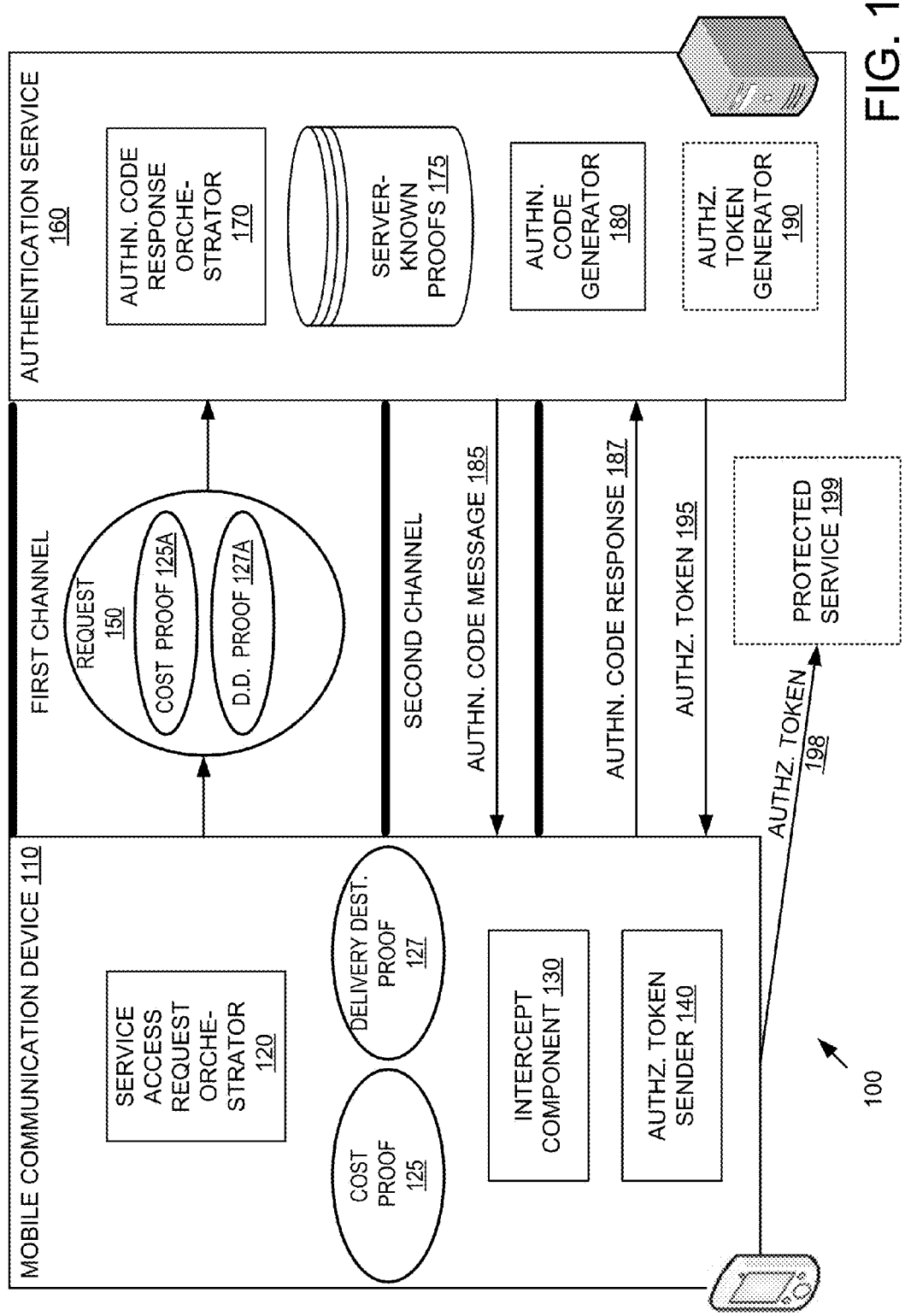
FIG. 1 is a block diagram of an example system implementing transparent two-factor authentication via a mobile communication device.

FIG. 1 is a block diagram of an example system 100 implementing transparent two-factor authentication via a mobile communication device as described herein.

For purposes of context, FIG. 1 shows that the communication device 110 is in communication with an authentication service 160 via one or more networks (not shown) over at least two different communication channels. As described herein, third parties can also participate in the technologies by which the authentication service 160 provides authentication for a communication between the communication device 110 and a service (e.g., 199) offered by a third party.

In the example, a mobile communication device 110 includes a service access request orchestrator 120, a cost proof 125, and a delivery destination proof 127. The orchestrator 120 can be operable to send the cost proof 125 and the delivery destination proof 127 as part of a service access request 150. As described herein, the sent versions 125A, 127A included in the request 150 can be obfuscated versions of the proofs 125, 127. In a two-factor authentication scenario, additional information (e.g., user name and password) can be included in the request 150.

Also included are an intercept component 130 and an authorization token sender 140 that can perform functions after an authentication code message 185 is received responsive to sending the request 150.

The authentication service 160 comprises an authentication code response orchestrator 170 and server-known proofs 175. The authentication code response orchestrator can receive the service access request 150, and access the server-known proofs 175 to accomplish authentication transparently to a user of the communication device 110. An authentication code generator 180 can generate authentication codes as described herein.

For purposes of context, an authorization token generator 190 is also shown, but the details of token generation can vary greatly and be implemented external to the orchestrator 170.

If initial authentication of the request 150 is successful (e.g., the request purports to be from a recognized delivery destination, and the cost proof is valid), an authentication code message 185 comprising an authentication code can be sent via a different channel back to the communication device 110.

At the communication device, the intercept component 130 can be configured to intercept the authentication code message 185 and derive an authentication code therefrom. The intercept component 130 can then automatically respond to the authentication code message by sending with a message 187 comprising the authentication code, thereby completing the authentication process from the device 110 perspective. The message 187 can include the cost proof 125 for further protection. Any of the messages herein can be sent over different channels.

After the message 187 is processed (e.g., verified) at the service 160, authentication is completed from the service 160 perspective. An authorization token 195 (e.g., generated by the generator 190) is then sent by the service 160 and received by the device 110.

The authorization token sender 140 can be configured to then send the authorization token 198 to the service 199 that is protected by the authentication process (e.g., to the location indicated in the authentication code message or some other location). As described herein, the authorization token 198 and authentication code can be sent via a variety of mechanisms (e.g., web API, URL, web browser or the like).

As described herein, two-factor authentication can be achieved by the technologies transparently to a user of the communication device 110.

Although various components are shown in separate boxes, in practice, component boundaries may vary. For example, the components can be provided as part of a phone operating system, application, or the like. Other arrangements are possible while still implementing the technologies.

In practice, the systems shown herein, such as system 100, can be more complicated, with additional functionality, more components, and the like. For example, although the authentication service 160 is shown as a single box, it can be implemented as a server farm that implements load balancing, redundancy, and other technologies to achieve acceptable scalability.

The technologies can be implemented in and described from different perspectives. For example, a request 150 "sent from" a communication device 110 is "received by" the authentication service 160, but both perspectives can effectively describe a same act from an overall perspective.

The system 100 and any of the other systems described herein can be implemented in conjunction with any of the hardware components described herein, such as the computing systems or mobile devices described below (e.g., comprising one or more processors, memory, and the like). In any of the examples herein, the inputs, outputs, proofs, tokens, codes, and applications can be stored in one or more computer-readable storage media or computer-readable storage devices. The technologies described herein can be generic to the specifics of operating systems or hardware and can be applied in any variety of environments to take advantage of the described features.

Example 3—Example Method Implementing Seamless Call Transitions

Figure 2:
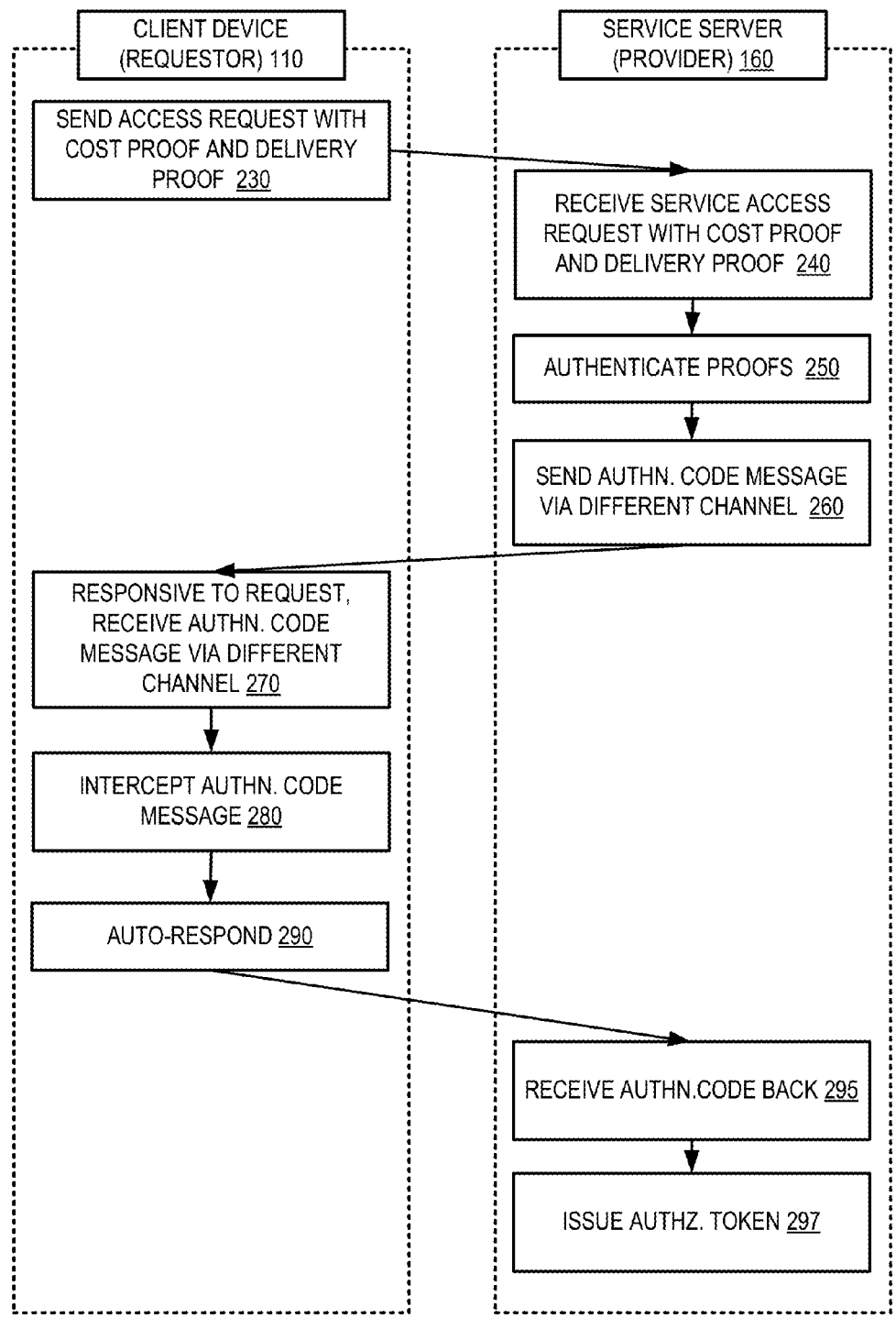
FIG. 2 is a flowchart of an example method of implementing transparent two-factor authentication via a mobile communication device.

FIG. 2 is a flowchart of an example method 200 of implementing transparent two-factor authentication via a mobile communication device and can be implemented, for example, in the system shown in FIG. 1.

The method 200 is typically performed before access to a service protected by the authentication process is granted. In practice, the method can be invoked when a user attempts to access or sign in to such a service. In a transparent scenario, the method 200 can be automatically invoked when a user attempts to access or sign in to the service. For example, a user can invoke the service, sign in using a user interface, or the like. As described herein, two-factor authentication can be performed transparently to the user in that a separate interface or field is not shown to the user, and the user is not required to enter a code to establish the second factor.

Further, the technologies can be arranged so that a policy change at the service server 160 can affect whether or not two-factor authentication is used. For example, service access requests and authorization tokens can take the same form whether or not two-factor authentication is used. As a result, a protected service can operate independently of whether two-factor authentication is in fact being used for authentication.

As shown, the method 200 can be performed by two systems: a client device or requestor 110 (e.g., the mobile communication device 110 of FIG. 1) and a service server or provider 160 (e.g., the authentication service 160 of FIG. 1). In practice, the method 200 can be described from the perspective of either system (e.g., with acts for the other system passively described or omitted) or both. As described herein, the authentication service and the ultimate service protected by the authentication process can be provided by the same or different entities.

At 230, a service access (e.g., authorization) request is sent. As described herein, the service access request can comprise a cost proof and a delivery destination proof. An additional authentication factor (e.g., username and password) can be included in the request. As described herein, to facilitate subsequent interception, a watch can be initiated for a response to the request.

At 240, the service access request is received with the cost proof and the delivery destination proof.

At 250, the proofs are authenticated. For example, if a provided delivery destination proof is present in a server known proof, the delivery destination proof is verified, and the process proceeds. Any cost proof can also be authenticated. Otherwise, the request is denied. In practice, denied requests can simply not be responded to, or an error message can be sent. Or, for example, manual entry of the authorization token can be forced.

As described herein, authentication can involve consultation with another party. In some cases, a proof can be authenticated by virtue of sending information to it. The authentication process can accept the proofs as input and then output success (e.g., authentication) or failure (e.g., no authentication).

Upon authentication of the proofs, an authentication code message is sent 260 back to the client device 110 via a different channel. As described herein, the authentication code message comprises information sufficient to derive an authentication code. At 270, responsive to the authentication code message, the authentication message is received (e.g., via the different channel).

At 280, the authentication code message is intercepted. As described herein, the authentication code can then be derived from the message and an auto-response 290 sent back to the service server 160, which receives it back as a response to the authentication code message at 295. As described herein, a cost proof can also be included at this stage, which is authenticated before the authorization token is provided.

Responsive to receiving the authentication code, the service server 160 can then generate an authorization token, which is sent back to the client 110 for accessing the service protected by the authentication process.

The authorization token is then used. For example, the authorization code can be submitted to the service protected by the authentication process to access the service. As described herein, a cost proof can also be included at this stage, which is authenticated before the service is provided. Such an arrangement can reduce the impact and occurrence of surreptitious attempts to guess valid authentication codes.

Thus, a one-time access code can be received, and responsive to receiving the one-time access code (e.g., and authenticating it), access to a service protected by the authentication process can be provided.

The method 200 and any of the other methods described herein can be performed by computer-executable instructions (e.g., causing a computing system to perform the method) stored in one or more computer-readable media (e.g., storage or other tangible media) or stored in one or more computer-readable storage devices. As described herein, the acts performed by the different systems can be performed on different devices to accomplish implementation.

Example 4—Example Transparency

In any of the examples herein, transparency (e.g., to a user) can be provided during the two-factor authentication process. For example, a user need not memorize, write down, or copy-and-paste an authentication code. Thus, the very existence of the second factor can be transparent to the user. Instead, as described herein, the code can be intercepted and provided without action by the user. In some cases, it may be desirable to alert the user to the existence of the second factor (e.g., to indicate that enhanced security is in effect) while shielding the user from the details concerning how it operates and avoiding any explicit action on the part of the user. Further, the technologies herein can work with systems that already provision for two-factor authentication while increasing transparency.

Although total transparency is possible, it is sometimes desirable to allow a user to see some aspects of the process. For example, the authentication code can be made user-readable or user-accessible if desired in a semi-transparent scenario, even if it is ordinarily provided without user intervention. As an example, a link can be placed in a message (e.g., SMS) by which authentication can be completed, even though the user did not explicitly provide information regarding a second factor.

Example 5—Example Service Access Request

In any of the examples herein, a service access request can take any of a variety of forms. As shown, the service access request can include a variety of first factors (e.g., username and password) as well as the second factor as described herein (e.g., a delivery destination). As described herein, a cost proof can also be included.

Although shown as a single request in some examples, in practice, the request can be broken into separately-communicated messages or pieces that serve as a single logical request. Similarly, different messages or pieces can be sent over different channels.

Example 6—Example Factors

As described herein, the first factor can take the form of a user login (e.g., username and password) or other set of credentials that a user knows. In practice, additional items can be employed as part of the user login (e.g., a username, password, and access code or PIN can be used, or the like).

As described herein, the second factor can take the form of a delivery destination proof (e.g., something the user has, to which the access code can be sent).

In practice, any of the factors can be encrypted, hashed, or otherwise obfuscated when stored and/or communicated to further enhance aspects of security.

Example 7—Example Cost Proof

In any of the examples herein, a cost proof can be included as information sent by the client side and received by the server side. The cost proof can establish that the requesting device is a genuine, registered device participating on the network of a mobile network operator (e.g., is associated with a paying account). It thus proves that the user has a subscribed device, and the cost proof can work in concert with the second factor described herein. For example, the cost proof can establish that the device is maintained by a subscriber to the network over which the delivery destination is valid (e.g., the authentication code can be sent over the network to the device).

An example embodiment of a cost proof is a digital certificate that establishes that the device is a bona fide, activated device of a mobile network operator. For example, during the activation process for the device, a digital certificate tied to the device can be generated. The certificate need not be tied to the user directly. An activation can thus be configured to obtain the cost proof as part of an activation process for the mobile communication device. Such a generation process can use public-private key encryption technologies. For example, a private key in the device (e.g., embedded therein by an original equipment manufacture or in an installed subscriber identity module card or the like) can be used to generate a digital certificate during activation and be tied to the device. The number of cost proof certificates that can be generated from the private key can be restricted. The cost proof can be generated and authenticated by a cost proof authority. In practice, the cost proof authority can be different from the service that verifies the first factor and different from the service that authenticates the delivery destination proofs. However, cooperation or merging of the authorities is possible.

Authentication of the cost proof can be tied to the device to which it was granted. For example, a unique device number, phone number, SIM number, or the like can be provided along with the cost proof during authentication to prevent sharing of cost proofs. The cost proof can establish a relationship between a mobile network operator (e.g., phone carrier) and the device.

The cost proof can establish that the device is associated with an account holder with the authentication service, and the account is associated with the delivery destination that is accessible via the device.

During communications over a network, via the cost proof, it can be established (e.g., via authentication) that a service access request is originating from a device (e.g., the mobile communication device) maintained by a paying subscriber of a mobile network operator. The cost proof can be provided in the form of a certificate that can be made to expire, be revocable, or the like. The network address (e.g., phone number) of the delivery destination proof can be for the network over which the device has been activated, and the network can be different from the one over which the service access request is sent.

Authentication of the certificate can be accomplished via the cost proof authority that interacts with or serves as the mobile network operator. In this way, the certificate can establish that the device is being maintained by a paying customer.

Other aspects of the cost proof certificate can be incorporated to indicate, for example, that the device is configured to take advantage of a particular operating system or account management system.

In practice, the cost proof can take a variety of forms, and multiple cost proofs can be used with the technologies herein as appropriate.

Additional layers of security can be used (e.g., SSL or the like) when communicating the cost proof or other items over the network(s).

Example 8—Example Cost Optimization

In any of the examples herein, a cost proof can serve as part of a cost optimization. The cost optimization can function to reduce costs (e.g., expenditure of computing resources, communication resources, or the like) associated with protecting services via authentication as described herein.

For example, by including the cost proof as part of the service access request, the server need only respond to those service access requests that are authenticated by the cost proof. Thus, responses can be limited to those originating from devices maintained by paying subscribers of the network.

Similarly, the cost proof can accompany the authentication code when requesting an authorization token to limit access to those requests originating from devices maintained by paying subscribers of the network (e.g., to prevent guessing of authentication codes).

Delivery destination proofs can also provide cost optimization when compared with those on file at the server (e.g., with or without obfuscation). For example, requests originating from non-recognized proofs can be ignored.

In this way, the authentication service and the service protected by it can reduce overall expenses (e.g., resources) associated with responding to requests originating from arbitrary devices. In the case of a cost proof that establishes a request or an access attempt is coming from a legitimate device, helpful responses can be provided, even if authentication fails for some other reason (e.g., incorrect password, expired authentication code, or the like).

Example 9—Example Delivery Destination Proof

In any of the examples herein, a delivery destination proof establishes that the user has a device to which an authentication message (e.g., with an authentication code) can be sent (e.g., "something you have"). In practice, the user typically knows the delivery destination proof, and it can take the form of a telephone number of the mobile communication device, a user name or identity of an account (e.g., email address) accessible with the mobile communication device, a social network name, a network address of the mobile communication device, a push destination, authenticator application, or the like, or otherwise be derived therefrom. The delivery destination proof can thus indicate and serve as an authentication message destination (e.g., correlated with the mobile communication device), and the authentication code message can be sent to the destination. The delivery destination can be monitored by the mobile communication device, and authentication code messages sent to the destination can be intercepted and responded to as described herein.

More than one delivery destination proof can be provided as part of a service access request. The server can then use the one that is known or choose the one that is most appropriate (e.g., the communication path is available).

Thus, sometimes that delivery destination proof is said to be "server-known" when the server has a record of it. However, even if the destination proof is server-known, it can still be obfuscated by the client when sent to the server (e.g., the server need not receive a clear text version of the server-known proof in order to use it). For example, a request may contain multiple phone numbers in obfuscated form, thus avoiding the prospect of phone number harvesting by the server.

As described herein, the delivery destination proof can be matched at the server, even if it is obfuscated. For example, hashing or truncation techniques can be used to match the incoming obfuscated proof with a server-known proof.

Example 10—Example Protected Services

In any of the examples herein, a service protected by the authentication technologies can take any of a variety of forms of web-based, application-based, cloud-based, or other services provided over a network that can be accessed via client devices. As described herein, the service can be operated independently of or in conjunction with the authentication services.

Example 11—Example Communication Channels

In any of the examples herein, different communication channels can be used to further enhance security. For example, the authentication code message can be sent via a different channel than that used for the service access request.

Such communication channels can take the form of a data communication channel (e.g., over a data network, Wi-Fi, or other Internet-accessible channel), cell phone (e.g., public switch telephone network) channel (e.g., SMS, voice, or the like), or other technologies, whether in existence or developed in the future.

When accessing a protected service, the authorization token can be sent over a different channel (e.g., different from the one over which the authentication code message was sent).

Example 12—Example Obfuscation

In any of the examples herein, the information communicated between client and server can be obfuscated. For example, encryption, hashing, truncating, or the like can be used. In some cases, the information communicated is derived from the original information, and in other cases information indicating the original information can be communicated.

In addition, levels of indirection (e.g., a link) can be provided in place of any information where appropriate.

Example 13—Example Authentication Code

In any of the examples herein, an authentication code can take any of a variety of forms that can enhance security of the authentication process. For example, a one-time access code can be used by which a user can obtain an authorization token via the code. Conventional technologies can be used to authenticate such authentication codes. Any other authentication code technique can be implemented while still falling within the technologies.

Example 14—Example Authentication Code Message

In any of the examples herein, an authentication code message can provide information containing or sufficient to obtain an authentication code for completing the authentication process.

As described herein, such messages can be communicated via a short message service (SMS) channel, voice channel, email, or other technique. However they are provided, the messages can be intercepted and responded to as described herein to implement transparency.

The authentication code itself or a link to the code can be provided in the message. As described herein, the authentication code can take a variety of forms, such as a one-time access code or the like.

In practice, the authentication code is sent back to the service from which it originated; however, an alternative would be to communicate the code to a third party, which could receive it to complete the authentication process. If desired, a location at which the authentication code can be submitted can be included in the authentication code message. For example, a uniform resource locator (URL) can be provided along with the code. The code can be incorporated into the URL (e.g., <URL>/code) or provided separately (e.g., as a separate item in the message).

Help to a user can be provided via navigation to the URL. In this way, a user-tappable URL in a received message can result in a help message to assist in using the code or providing further information to a user.

Information can be included in the message to distinguish it as an authentication code message (e.g., so it can be intercepted). The location or other indicator can serve such a distinguishing purpose.

Example 15—Example Derivation of Access Code from Message

In any of the examples herein, an access code can be derived from an access code message that is sent by the authentication service and received by the mobile communication device. For example, the code may simply be present in the message. Alternatively, the code can be accessed from a location indicated in the message, or the code can be encrypted or otherwise obfuscated in the message. Further possible access code message formats are described herein.

Example 16—Example Authorization Token

In any of the examples herein, an authorization token can take any of a variety of forms that provide access to a service protected by the authentication process. For example, a one-time access code or authorization ticket can be used by which a user can access a service via the token. Conventional technologies can be used to validate such authorization tokens. Any other authorization token technique can be implemented while still falling within the technologies.

Example 17—Example Authorization Token Message

In any of the examples herein, an authorization token message can provide information containing or sufficient to obtain an authorization code by which a protected service can be accessed.

As described herein, such messages can be communicated via public network (e.g., the Internet), a short message service (SMS) channel, voice channel, email, or other technique. However they are provided, the messages can be received and the token used as described herein to implement transparency.

The authorization token itself or a link to the token can be provided in the message. As described herein, the token can take a variety of forms, such as a one-time access code or the like.

If desired, a network location at which the token can be submitted can be included in the message. For example, a uniform resource locator (URL) can be provided along with the token. The token can be incorporated into the URL (e.g., <URL>/token) or provided separately (e.g., as a separate item in the message). The authorization token message can thus comprise a hyperlink incorporating the authorization token. If presented to the user, the hyperlink can be activated to access the service.

If desired, the one-time access code can be for a third-party (e.g., ultimate) service (e.g., provided by a party other than the authentication service provider), and the submission location can indicate a location at which the third-party service can be accessed via the token, even if the authentication service is provided independently of the third-party service.

To support extensibility, including a variety of different token formats (e.g., multiple tokens, different token lengths, or the like), an indicator of the token format can be included. The location at which the token can be submitted can serve as a code format indicator.

The token format indicator can be consulted and used to map to a particular format which is used to extract the token from the message and submit it as needed to gain access to the protected service. A mapping between token format indicators and token formats can be stored at the device or maintained in the cloud. New formats can be registered, and old formats can be de-registered.

Information can be included in the message to distinguish it as an authorization token message (e.g., so it can be intercepted). The location or token format indicator can serve such a distinguishing purpose.

Example 18—Example System Accessing a Protected Service: Intercept Component In any of the examples herein, an authentication code message can be intercepted at the client. Such an arrangement can accomplish transparency of the two-factor authentication process.

Figure 3:
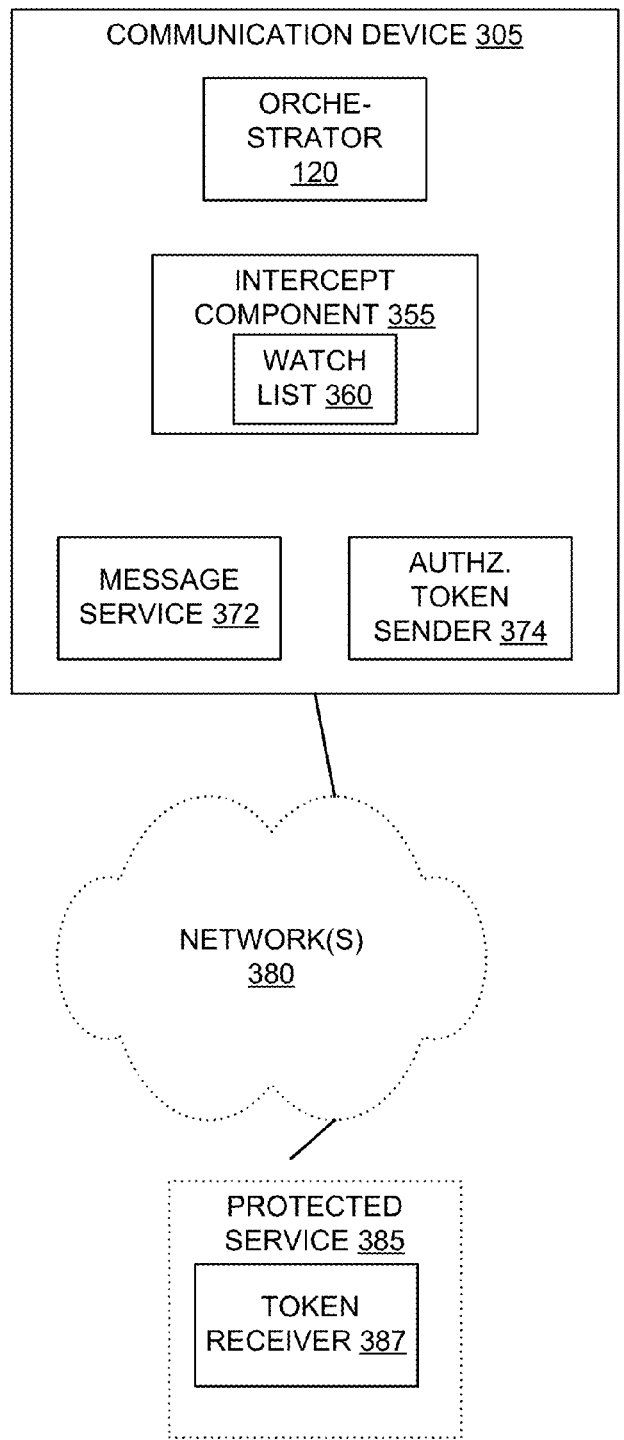
FIG. 3 is a block diagram of an example system configured to access a protected service via transparent two-factor authentication.

FIG. 3 is a block diagram showing an example system 300 configured to access a protected service via transparent two-factor authentication and implementing an intercept component 355. In the example, a communication device 305 (e.g., a client) comprises a service access request orchestrator 120, an intercept component 355 (e.g., with a watch list 360) implementing interception and auto-response, an message service 372 for sending and/or receiving messages (e.g., SMS messages, messages over a network connection, or the like), and an authorization token sender 374. The intercept component and authorization token sender can work with the message service 372 or another channel to accomplish sending the authentication code and/or authorization token. As in the other examples involving systems, the boundaries between components and whether components are incorporated into each other can be altered while still implementing the technologies.

The communication device 305 communicates with a protected (e.g., ultimate) service 385 (e.g., with a token receiver 387) via a network 380. Although not shown, communication can also take place with an service that provides an authentication code message and/or authorization token message as described herein.

Although the term "interception" is used. The message to the client can continue along its ordinary path. For example, an SMS can appear in the SMS message store. However, notifications can be suppressed if desired (e.g., to maintain transparency).

Figure 4:
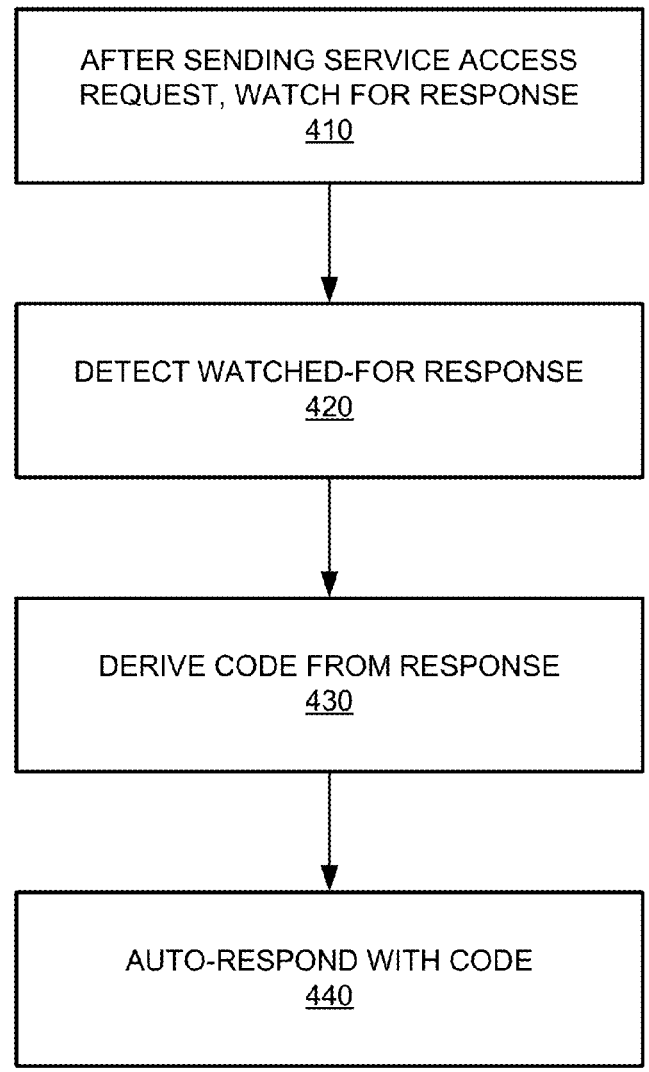
FIG. 4 is a flowchart of an example method of implementing transparent two-factor authentication via watch functionality.

Example 19—Example Method Implementing Transparent Two-Factor Authentication Via Watch Functionality FIG. 4 is a flowchart of an example method 400 of implementing transparent two-factor authentication via watch functionality and can be implemented, for example, in the systems shown in FIG. 1 or FIG. 3. In practice, the method 400 is typically invoked after a service access request is sent to an authentication service. The method can be implemented to preserve the transparent nature of the authentication. For example, watching can intercept an access code received from the authentication service instead of requiring a user to write it down, memorize it, or paste it into a user interface. Alternatively, a special string or other indicator can be included in an authentication code message an/or authorization token message to denote it as to be intercepted.

A response to a service access request can be intercepted as shown. At 410, after a service access request is sent, a response is watched for. As described herein, an entry can be placed in a watch list, and the watch can be set to expire after time has elapsed. Thus, a watch period for the service access request can be implemented.

At 420, the watched-for response is detected. For example, incoming messages can be monitored to detect a particular format or occurrence of a string or the like. An implementation can monitor SMS messages or another message channel to detect the watched-for response that is sent responsive to the service access request. Responses that come in after the watch period expires can be ignored.

As described herein, interception can suppress ordinary message notification. For example, in the case of an SMS, the ordinary SMS alert can be suppressed. In the case of an incoming voice call, a special property associated with the call can identify it as a response to an service access request, and the ordinary incoming call notification can be suppressed. Voice recognition or other technology can acquire the access code from the incoming call.

Responsive to detection of the response, watching can cease. For example, the entry from the watch list can be removed. If the authentication code message comes in after the watch has expired, it can be of a user-readable (e.g., user-tappable) format that still allows access of the protected service. Therefore, it can be delivered in the ordinary way (e.g., as an incoming SMS or email), and access to the service can still be accomplished.

At 430, the authentication code is derived from the authentication code message. As described herein, a code can be extracted, a link can be followed, or the like.

At 440, an automatic response (e.g., comprising the authentication code) is sent to the authentication service. The actual sending can be performed by a different component. The authentication service then responds with the authorization token.

Although the above example shows a watch list for an authentication code, a similar technique can be used to implement a watch list for an authorization token. Upon receipt of the watched-for authorization token message (e.g., containing information for deriving the authorization token), the authorization token can be derived from an authorization token message and automatically submitted to obtain access to the requested service.

As described herein, a cost proof can be included at one or more parts of the process for further protection and/or cost optimization.

Example 20—Example Watch List

Figure 5:
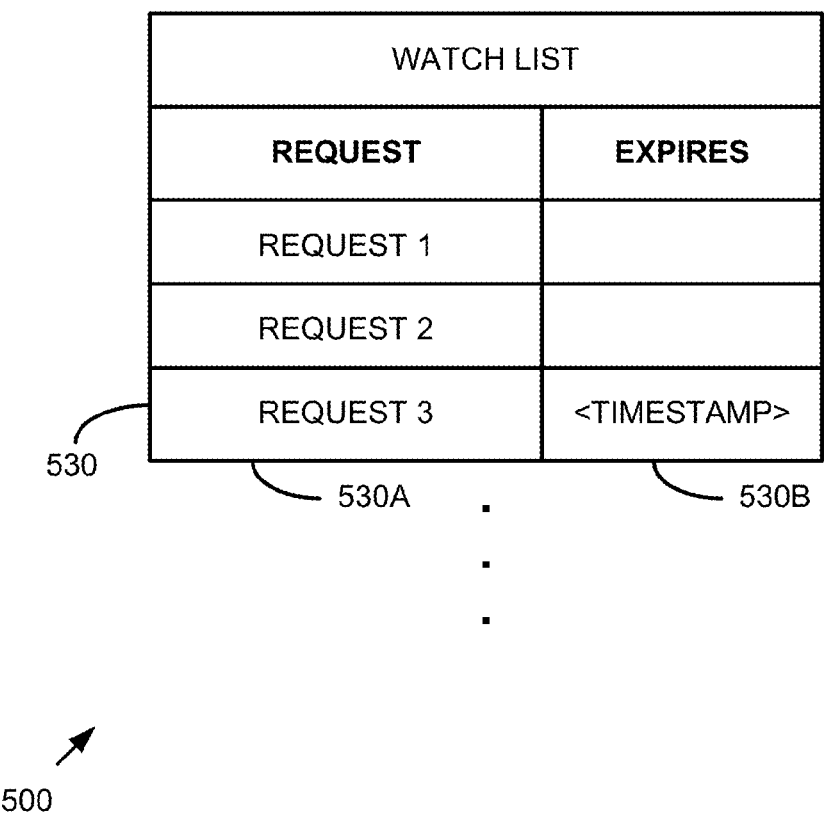
FIG. 5 is a block diagram of an example watch list for use with watch functionality.

FIG. 5 is a block diagram of a table 500 storing a watch list and can be stored at a mobile communication device requesting service access from an authentication server as described herein.

The table 500 can be used to implement watch functionality described herein. The watch list can indicate one or more outstanding service access requests being watched for (e.g., by an intercept component). In the example, a watch entry 530 takes the form of a request identifier 530A and an expiration timestamp 530B. Other information (e.g., type of request, watch string, or the like) can be included.

Upon sending a service access request, an entry can be added to the table 500. Upon expiration, the watch is no longer valid (e.g., responses are ignored, or an error is sent and another request can be generated). Fulfilled requests can be removed (e.g., deleted, marked as fulfilled, or the like).

The table can be built and updated when service access requests are sent and responses are received. Although the example shows watching for authorization codes sent in response to service requests, a similar approach can be used when watching for authorization tokens sent in response to sent authorization codes.

Example 21—Example User Interface Supporting Transparent Two-Factor Authentication In any of the examples herein, a user interface option can be presented for authentication. However, the two-factor aspect of authentication can be transparent in that it is not presented as a separate part of the interface (e.g., the second factor is handled transparently to the user).

Figure 6:
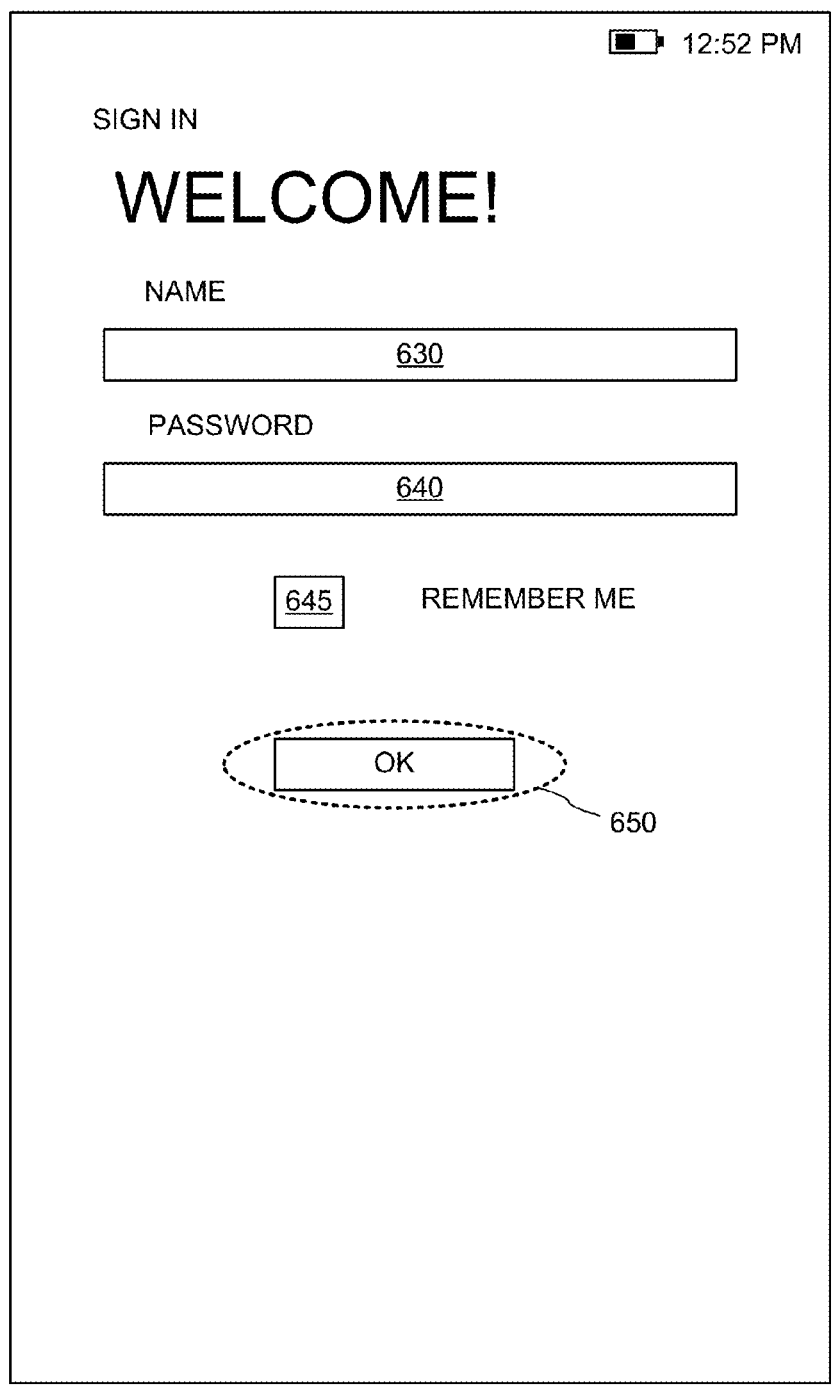
FIG. 6 is a wire frame of an example authentication user interface usable in conjunction with transparent two-factor authentication via a mobile communication device.

FIG. 6 is a wire frame of an example authentication user interface 600 usable in conjunction with transparent two-factor authentication via a mobile communication device. In the example, the user simply enters in the first factor (e.g., username 630 and password 640) and initiates the request (e.g., via a user interface element 650).

From the standpoint of the user interface, direct navigation to the service can then proceed. If desired, a generic progress indicator can be displayed (e.g., to indicate that authentication is in progress), on the client or the server.

If desired, the first factor can be remembered by the device when desired (e.g., as indicated by user interface element 645). For future accesses, authentication can be completely transparent in that the username and password as well as any second factor(s) are also provided as part of the authentication process.

In practice, an invisible user interface (e.g., a background form) can be presented and filled in with the authentication code (e.g., via AJAX or the like). however, any number of implementations are possible, including submission of the authentication code via a web API, URL, or the like. Without support from the service, such a result can also be done by a client showing a page in front of (e.g., superimposed over) the user interface.

Example 22—Example Implementation with Multiple Protected Services

Figure 7:
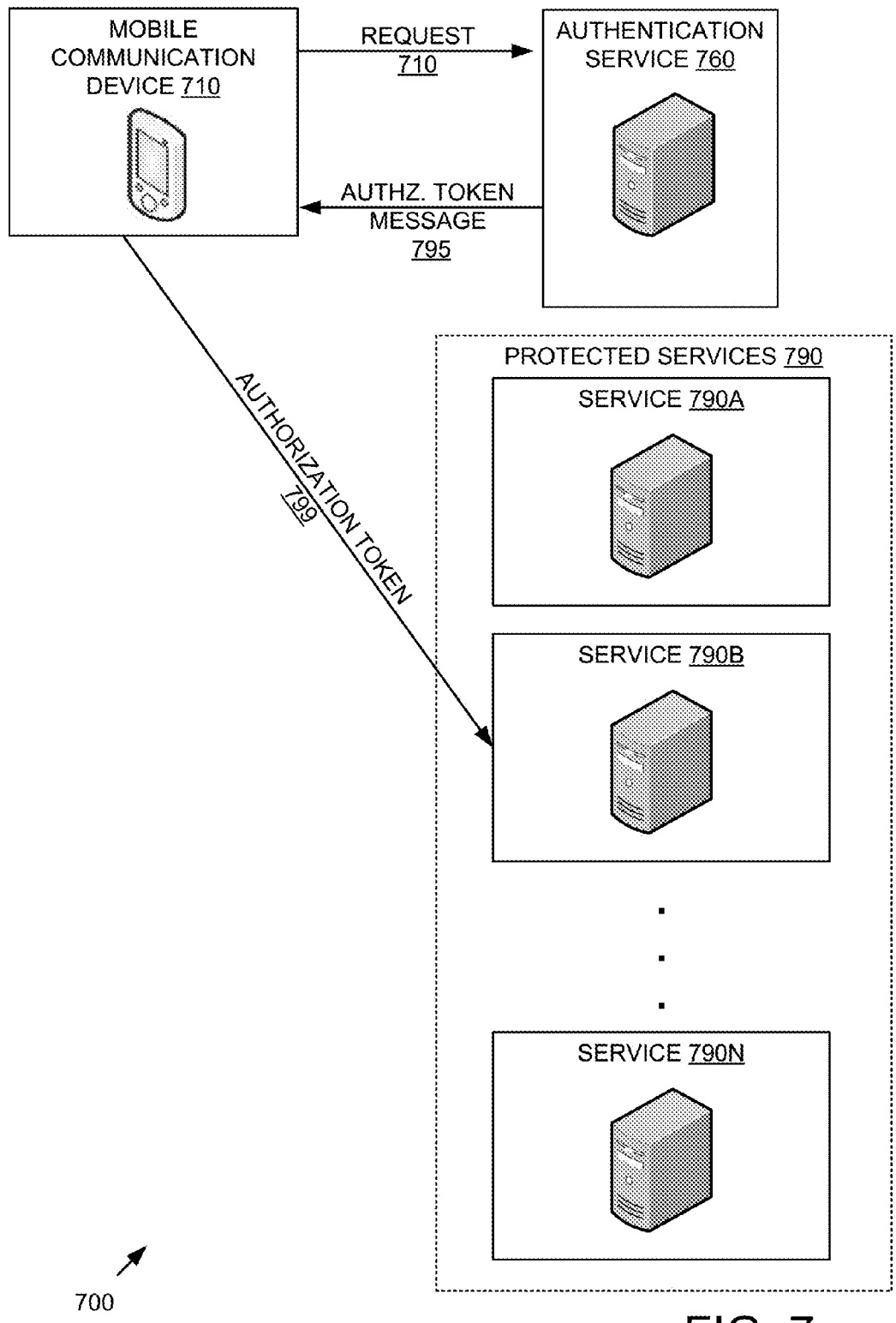
FIG. 7 is a block diagram of an example system configured to provide transparent two-factor authentication via a mobile device for a plurality of protected services.

FIG. 7 is a block diagram of an example system 700 configured to provide transparent two-factor authentication via a mobile device for a plurality of protected services. In the example, a mobile communication device 710 can access any of a number of protected services 790A-N via a single authentication service 760. A request 710 is sent as described herein, and an authorization token message 795 is received.

The authorization token can then be sent to the particular service 790B being accessed. As described herein, authentication code messages can be sent, cost proofs can be included, and different channels can be used.

The service 760 and the protected services 790A-N can be operated by the same entity, or the service 760 can be provided as a service to one or more entities independently operating the services 790A-N.

Thus, one or more third parties can be integrated into the system 700. A mapping can be provided by which an authorization token message is interpreted and handled differently depending on the format or functionality associated with a particular third party authentication scheme.

Technologies can be integrated into the service so that a single party implements both the authentication service and the service protected by the authentication process. Or, the service can be provided by a third party (e.g., a party other than the party providing the authentication service).

Example 23—Example Set Up

In any of the examples herein, communication can take place before a service access request as part of set up. For example, a user can subscribe to a service and provide delivery destination proofs in advance. Cost proofs can be obtained via activation of a device. Usernames and passwords can be configured in advance, and the like.

Example 24—Example Advantages

In any of the examples herein, transparent two-factor authentication can be helpful in a mobile device context. For example, it can be difficult for a user to manage multiple windows or multiple fields if dealing with a service that provides additional information that is to serve as a second factor.

Example 25—Example Computing Systems

Figure 8:
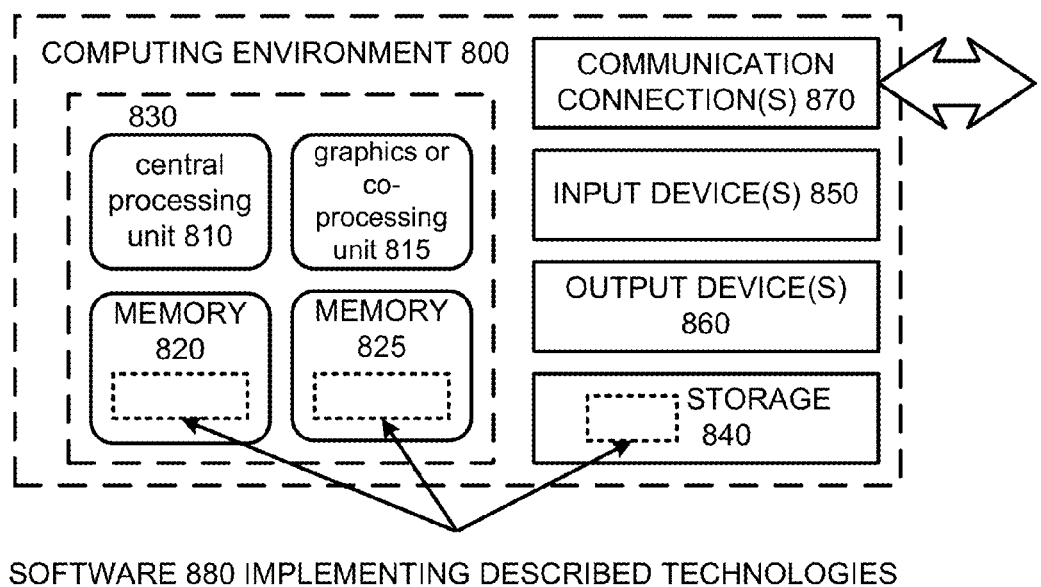
FIG. 8 is a diagram of an example computing system in which some described embodiments can be implemented.

FIG. 8 illustrates a generalized example of a suitable computing system or environment 800 in which several of the described innovations may be implemented. The computing system 800 is not intended to suggest any limitation as to scope of use or functionality, as the innovations may be implemented in diverse general-purpose or special-purpose computing systems. A communication device as described herein can take the form of the described computing system 800.

With reference to FIG. 8, the computing system 800 includes one or more processing units 810, 815 and memory 820, 825. In FIG. 8, this basic configuration 830 is included within a dashed line. The processing units 810, 815 execute computer-executable instructions. A processing unit can be a general-purpose central processing unit (CPU), processor in an application-specific integrated circuit (ASIC) or any other type of processor. In a multi-processing system, multiple processing units execute computer-executable instructions to increase processing power. For example, FIG. 8 shows a central processing unit 810 as well as a graphics processing unit or co-processing unit 815. The tangible memory 820, 825 may be volatile memory (e.g., registers, cache, RAM), non-volatile memory (e.g., ROM, EEPROM, flash memory, etc.), or some combination of the two, accessible by the processing unit(s). The memory 820, 825 stores software 880 implementing one or more innovations described herein, in the form of computer-executable instructions suitable for execution by the processing unit(s).

A computing system may have additional features. For example, the computing system 800 includes storage 840, one or more input devices 850, one or more output devices 860, and one or more communication connections 870. An interconnection mechanism (not shown) such as a bus, controller, or network interconnects the components of the computing system 800. Typically, operating system software (not shown) provides an operating environment for other software executing in the computing system 800, and coordinates activities of the components of the computing system 800.

The tangible storage 840 may be removable or non-removable, and includes magnetic disks, magnetic tapes or cassettes, CD-ROMs, DVDs, or any other medium which can be used to store information in a non-transitory way and which can be accessed within the computing system 800. The storage 840 stores instructions for the software 880 implementing one or more innovations described herein.

The input device(s) 850 may be a touch input device such as a keyboard, mouse, pen, or trackball, a voice input device, a scanning device, or another device that provides input to the computing system 800. For video encoding, the input device(s) 850 may be a camera, video card, TV tuner card, or similar device that accepts video input in analog or digital form, or a CD-ROM or CD-RW that reads video samples into the computing system 800. The output device(s) 860 may be a display, printer, speaker, CD-writer, or another device that provides output from the computing system 800.

The communication connection(s) 870 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-readable media. Computer-readable media are any available tangible media that can be accessed within a computing environment. By way of example, and not limitation, with the computing system 800, computer-readable media include memory 820, 825, storage 840, and combinations of any of the above.

The innovations can be described in the general context of computer-executable instructions, such as those included in program modules, being executed in a computing system on a target real or virtual processor (e.g., which is ultimately executed in hardware). Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

In general, a computing system or computing device can be local or distributed, and can include any combination of special-purpose hardware and/or general-purpose hardware with software implementing the functionality described herein.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 26—Example Mobile Device

Figure 9:
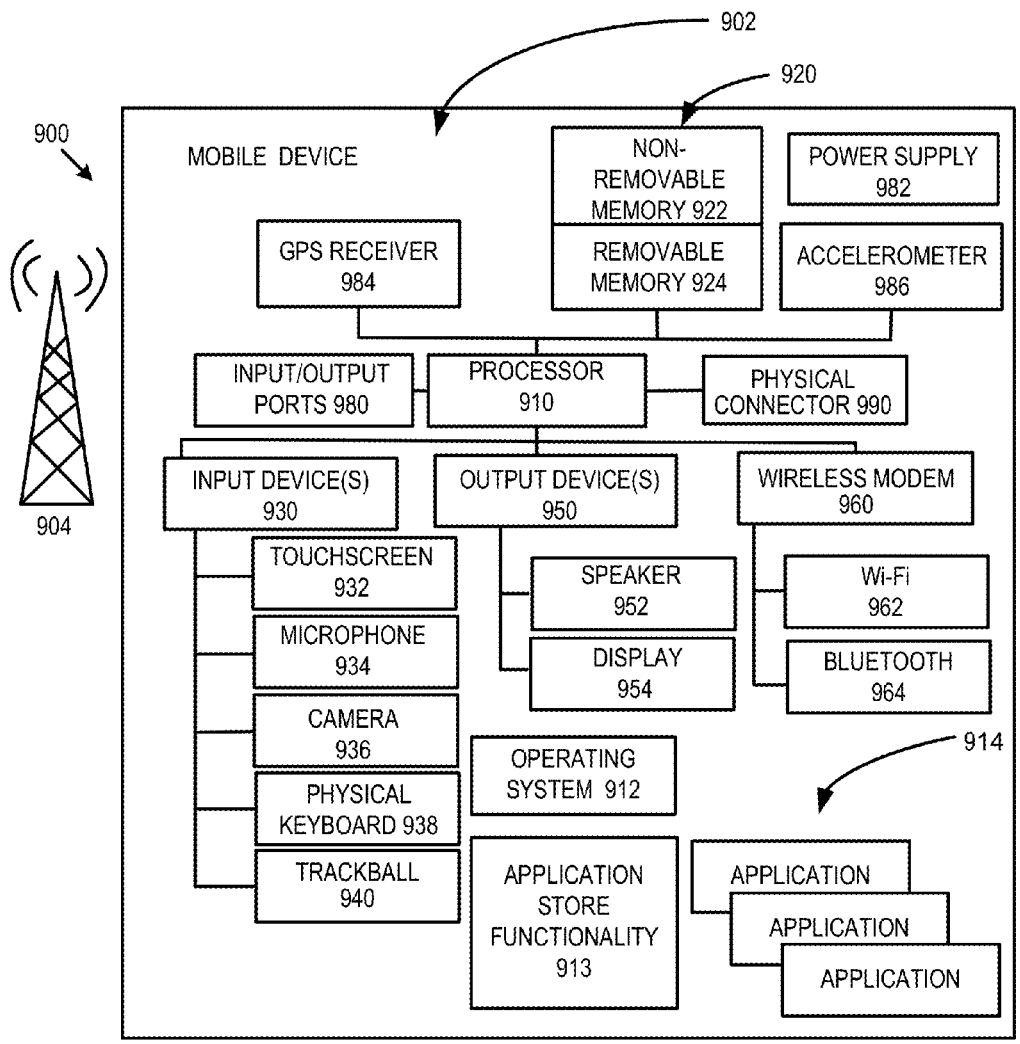
FIG. 9 is an example mobile device that can be used for the technologies described herein.

In any of the examples herein, a communication device can take the form of a mobile device. FIG. 9 is a system diagram depicting an example mobile device 900 including a variety of optional hardware and software components, shown generally at 902. Any components 902 in the mobile device can communicate with any other component, although not all connections are shown, for ease of illustration. The mobile device can be any of a variety of computing devices (e.g., cell phone, smartphone, handheld computer, Personal Digital Assistant (PDA), etc.) and can allow wireless two-way communications with one or more mobile communications networks 904, such as a cellular, satellite, or other network. Voice over IP scenarios (e.g., over WiFi or other network) can also be supported. The communication devices described herein can take the form of the described mobile device 900.

The illustrated mobile device 900 can include a controller or processor 910 (e.g., signal processor, microprocessor, ASIC, or other control and processing logic circuitry) for performing such tasks as signal coding, data processing, input/output processing, power control, and/or other functions. An operating system 912 can control the allocation and usage of the components 902 and support for one or more application programs 914. The application programs 914 can include common mobile computing applications (e.g., email applications, calendars, contact managers, web browsers, messaging applications), or any other computing application. Functionality 913 for accessing an application store can also be used for acquiring and updating applications 914.

The illustrated mobile device 900 can include memory 920. Memory 920 can include non-removable memory 922 and/or removable memory 924. The non-removable memory 922 can include RAM, ROM, flash memory, a hard disk, or other well-known memory storage technologies. The removable memory 924 can include flash memory or a Subscriber Identity Module (SIM) card, which is well known in GSM communication systems, or other well-known memory storage technologies, such as smart cards. The memory 920 can be used for storing data and/or code for running the operating system 912 and the applications 914. Example data can include web pages, text, images, sound files, video data, or other data sets to be sent to and/or received from one or more network servers or other devices via one or more wired or wireless networks. The memory 920 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment.

The mobile device 900 can support one or more input devices 930, such as a touch screen 932, microphone 934, camera 936, physical keyboard 938 and/or trackball 940 and one or more output devices 950, such as a speaker 952 and a display 954. Other possible output devices (not shown) can include piezoelectric or other haptic output devices. Some devices can serve more than one input/output function. For example, touchscreen 932 and display 954 can be combined in a single input/output device.

A wireless modem 960 can be coupled to an antenna (not shown) and can support two-way communications between the processor 910 and external devices, as is well understood in the art. The modem 960 is shown generically and can include a cellular modem for communicating with the mobile communication network 904 and/or other radio-based modems (e.g., Bluetooth 964 or Wi-Fi 962). The wireless modem 960 is typically configured for communication with one or more cellular networks, such as a GSM or CDMA network for data and voice communications within a single cellular network, between cellular networks, or between the mobile device and a public switched telephone network (PSTN).

The mobile device 900 can further include at least one input/output port 980, a power supply 982, a satellite navigation system receiver 984, such as a Global Positioning System (GPS) receiver, an accelerometer 986, and/or a physical connector 990, which can be a USB port, IEEE 1394 (FireWire) port, and/or RS-232 port. The illustrated components 902 are not required or all-inclusive, as any components can be deleted and other components can be added.

Example 27—Example Cloud-Supported Environment

Figure 10:
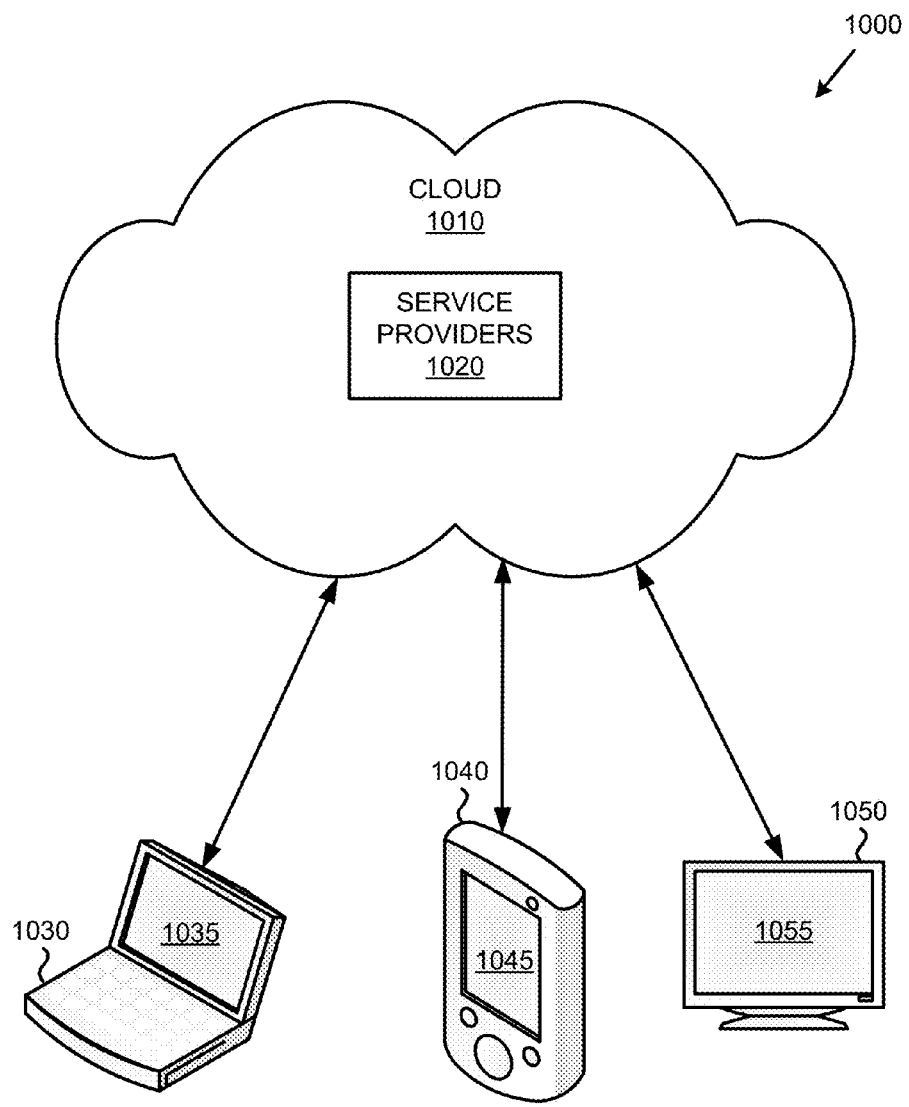
FIG. 10 is an example cloud-support environment that can be used in conjunction with the technologies described herein.

In example environment 1000 of FIG. 10, the cloud 1010 provides services for connected devices 1030, 1040, 1050 with a variety of screen capabilities. Connected device 1030 represents a device with a computer screen 1035 (e.g., a mid-size screen). For example, connected device 1030 can be a personal computer such as desktop computer, laptop, notebook, netbook, or the like. Connected device 1040 represents a device with a mobile device screen 1045 (e.g., a small size screen). For example, connected device 1040 can be a mobile phone, smart phone, personal digital assistant, tablet computer, and the like. Connected device 1050 represents a device with a large screen 1055. For example, connected device 1050 can be a television screen (e.g., a smart television) or another device connected to a television (e.g., a set-top box or gaming console) or the like. One or more of the connected devices 1030, 1040, 1050 can include touch screen capabilities. Touchscreens can accept input in different ways. For example, capacitive touchscreens detect touch input when an object (e.g., a fingertip or stylus) distorts or interrupts an electrical current running across the surface. As another example, touchscreens can use optical sensors to detect touch input when beams from the optical sensors are interrupted. Physical contact with the surface of the screen is not necessary for input to be detected by some touchscreens. Devices without screen capabilities also can be used in example environment 1000. For example, the cloud 1010 can provide services for one or more computers (e.g., server computers) without displays.

Services can be provided by the cloud 1010 through service providers 1020, or through other providers of online services (not depicted). For example, cloud services can be customized to the screen size, display capability, and/or touch screen capability of a particular connected device (e.g., connected devices 1030, 1040, 1050).

In example environment 1000, the cloud 1010 provides the technologies and solutions described herein to the various connected devices 1030, 1040, 1050 using, at least in part, the service providers 1020. For example, the service providers 1020 can provide a centralized solution for various cloud-based services. The service providers 1020 can manage service subscriptions for users and/or devices (e.g., for the connected devices 1030, 1040, 1050 and/or their respective users).

Example 28—Example Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions stored on one or more computer-readable storage media (e.g., non-transitory computer-readable media, such as one or more optical media discs, volatile memory components (such as DRAM or SRAM), or nonvolatile memory components (such as hard drives)) and executed on a computer (e.g., any commercially available computer, including smart phones or other mobile devices that include computing hardware). Any of the computer-executable instructions for implementing the disclosed techniques as well as any data created and used during implementation of the disclosed embodiments can be stored on one or more computer-readable media (e.g., non-transitory computer-readable media). The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C++, Java, Perl, JavaScript, Adobe Flash, or any other suitable programming language. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub-combinations with one another. The disclosed methods, apparatus, and systems are not limited to any specific aspect or feature or combination thereof, nor do the disclosed embodiments require that any one or more specific advantages be present or problems be solved.

Non-Transitory Computer-Readable Media

Any of the computer-readable media herein can be non-transitory (e.g., memory, magnetic storage, optical storage, or the like).

Storing in Computer-Readable Media

Any of the storing actions described herein can be implemented by storing in one or more computer-readable media (e.g., computer-readable storage media or other tangible media).

Any of the things described as stored can be stored in one or more computer-readable media (e.g., computer-readable storage media or other tangible media).

Methods in Computer-Readable Media

Any of the methods described herein can be implemented by computer-executable instructions in (e.g., encoded on) one or more computer-readable media (e.g., computer-readable storage media or other tangible media). Such instructions can cause a computing system to perform the method. The technologies described herein can be implemented in a variety of programming languages.

Methods in Computer-Readable Storage Devices

Any of the methods described herein can be implemented by computer-executable instructions stored in one or more computer-readable storage devices (e.g., memory, magnetic storage, optical storage, or the like). Such instructions can cause a computer to perform the method.

Alternatives

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the following claims. We therefore claim as our invention all that comes within the scope and spirit of the claims.

What is claimed is:

1. A method implemented at least in part by a computing system, the method comprising:
from a mobile communication device, receiving a service access request via a first channel, wherein the service access request comprises a delivery destination proof and a cost proof, the delivery destination proof comprising an obfuscated destination, and the cost proof comprising a digital certificate establishing that the mobile communication device is maintained by a paying subscriber of a second channel that is different from the first channel;
authenticating the delivery destination proof;
matching the obfuscated destination to a stored obfuscated destination;
authenticating the cost proof;
responsive to authenticating the delivery destination proof and the cost proof, sending an authentication code message to the matched destination via the second channel, wherein the authentication code message comprises an indicator to denote the authentication code message is to be transparently intercepted by a recipient device by causing the recipient device to automatically send a response to the authentication code message while suppressing ordinary message notification for the authentication code message;
receiving the response to the authentication code message; and
responsive to receiving the response to the authentication code message, sending an authorization token message to the mobile communication device.

2. The method of claim 1 further comprising:
sending the cost proof to the mobile communication device during activation of the mobile communication device.

3. The method of claim 1 wherein:
the delivery destination proof indicates a destination correlated with the mobile communication device; and
the authentication code message is sent to the destination.

4. The method of claim 1 wherein the delivery destination proof comprises:
a phone number of the mobile communication device; or
a user name of an account accessible with the mobile communication device.

5. The method of claim 1 wherein:
the authorization token message comprises a hyperlink incorporating an authorization token.

6. The method of claim 1 wherein:
the authorization token message comprises a one-time access code and a submission location for the one-time access code.

7. The method of claim 6 further comprising:
receiving the one-time access code; and
responsive to receiving the one-time access code, providing access to a protected service.

8. The method of claim 6 wherein:
the one-time access code is for a third-party service; and
the submission location indicates a location at which the third-party service can be accessed via the one-time access code.

9. One or more computer-readable storage devices comprising computer-executable instructions causing a computing system to perform a method comprising:
from a mobile communication device, receiving a service access request via a first channel, wherein the service access request comprises a delivery destination proof and a cost proof, the cost proof comprising a digital certificate establishing that the mobile communication device is maintained by a paying subscriber of a second channel that is different from the first channel, and a delivery destination proof comprising an obfuscated destination;
authenticating the delivery destination proof;
matching the obfuscated destination to a stored obfuscated destination;
authenticating the cost proof;
responsive to authenticating the delivery destination proof and the cost proof, sending an authentication code message to the destination via a channel different from the first channel, wherein the authentication code message comprises an indicator causing the recipient device to automatically send a response to the authentication code message and suppress message notification for the authentication code message so that the response is provided without action by a user of the recipient device;

receiving the response to the authentication code message; and responsive to receiving the response to the authentication code message, sending an authorization token message to the mobile communication device.

10. A mobile communication device comprising:

one or more processors coupled to memory;

a stored cost proof, the stored cost proof comprising a digital certificate establishing that the mobile communication device is associated with an account for a channel for receiving authentication code messages;

a stored delivery destination proof comprising an obfuscated destination, the destination associated with the mobile communication device;

a watch list indicating one or more outstanding authentication code messages being watched for;

a service access request orchestrator configured to send a request for access to a service, wherein the request comprises the stored cost proof and the stored delivery destination proof and is added to the watch list;

an intercept component configured to transparently intercept an incoming authentication code message received responsive to the request for access to the service and configured to, when the watch list indicates the authentication code message is outstanding, suppress message notification for the authentication code message and automatically respond thereto with a message comprising an authentication code and further configured to receive an authorization token sent in response to the message comprising the authentication code; and an authorization token sending component configured to send the authorization token in conjunction with a request for a service protected by two-factor authentication.

11. The mobile communication device of claim 10 further comprising:

an activation component configured to obtain the stored cost proof as part of an activation process for the mobile communication device.

12. The mobile communication device of claim 10 wherein:

the intercept component is configured to extract the authentication code from an incoming text message.

13. The mobile communication device of claim 12 wherein:

the incoming text message comprises a location at which access to a protected service can be obtained.

14. The mobile communication device of claim 13 wherein:

the authorization token sending component is configured to send the authorization token to the location indicated in the incoming text message.

15. In a mobile communication device, one or more computer-readable storage devices comprising:

a digital certificate establishing that the mobile communication device is associated with a paying account associated with a second channel;

a delivery destination proof derived from a delivery destination monitored by the mobile communication device, wherein the delivery destination comprises a telephone number of the mobile communication device; and computer-executable instructions causing the mobile communication device to perform a method comprising:

via a first channel, sending a service access request for a protected service, wherein the request comprises a username, password, the digital certificate, and the delivery destination proof;

transparently intercepting a message received via the second channel responsive to sending the service access request for the protected service via the first channel, wherein transparently intercepting comprises monitoring a watch list for a response to the service access request receivable via the delivery destination and suppressing message notification for the message;

from the message received via the second channel, deriving an authentication code;

sending an automatic response to the message received via the second channel, wherein the automatic response comprises the authentication code derived from the message that was received responsive to sending the service access request and the digital certificate and the mobile communication device thereby serves as a second factor in a transparent two-factor authentication process protecting the protected service associated with the service access request; and receiving an authorization token in response to the automatic response that comprises the authentication code derived from the message and the digital certificate;

whereby transparent two-factor authentication is performed transparently for the mobile communication device and it is established that the service access request is originating from a device associated with the paying account associated with the second channel.

16. The one or more computer-readable storage devices of claim 15 wherein the intercepting further comprises:

suppressing an ordinary message notification for the message received via the second channel.

17. The one or more computer-readable storage devices of claim 16 wherein:

the message received via the second channel comprises a short message service message; and suppressing comprises suppressing an ordinary short message service alert.

* * * * *